(12) United States Patent
McLaughlin

(10) Patent No.: US 10,248,306 B1
(45) Date of Patent: Apr. 2, 2019

(54) SYSTEMS AND METHODS FOR END-USERS TO LINK OBJECTS FROM IMAGES WITH DIGITAL CONTENT

(71) Applicant: Motorola Mobility LLC, Chicago, IL (US)

(72) Inventor: Michael David McLaughlin, San Francisco, CA (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/848,889

(22) Filed: Dec. 20, 2017

(51) Int. Cl.
| | |
|---|---|
| G06F 17/00 | (2019.01) |
| G06F 3/0488 | (2013.01) |
| G06Q 50/00 | (2012.01) |
| G06F 3/0482 | (2013.01) |
| G06F 3/0484 | (2013.01) |
| G06F 16/955 | (2019.01) |
| G06F 17/21 | (2006.01) |

(52) U.S. Cl.
CPC .......... *G06F 3/0488* (2013.01); *G06F 3/0482* (2013.01); *G06F 3/04842* (2013.01); *G06F 16/9558* (2019.01); *G06F 17/211* (2013.01); *G06Q 50/01* (2013.01)

(58) Field of Classification Search
CPC ............................ G06F 17/3028; G06F 17/211
See application file for complete search history.

(56) References Cited

U.S. PATENT DOCUMENTS

| | | | | |
|---|---|---|---|---|
| 6,741,188 B1 * | 5/2004 | Miller | ................ | G06Q 30/0255 340/539.13 |
| 7,236,966 B1 * | 6/2007 | Jackson | ............ | G06F 17/30867 |
| 7,353,246 B1 * | 4/2008 | Rosen | ............... | G06F 17/30855 707/999.01 |
| 9,760,077 B2 * | 9/2017 | Weatherhead | .......... | G06F 17/30 |
| 10,140,392 B1 * | 11/2018 | Bowen | .................... | G06F 17/50 |
| 2002/0107973 A1 * | 8/2002 | Lennon | ............. | G06F 17/30905 709/231 |
| 2002/0141641 A1 * | 10/2002 | Zhu | ..................... | G06K 9/00456 382/170 |
| 2006/0015925 A1 * | 1/2006 | Logan | .................... | G06Q 30/02 725/135 |
| 2007/0174269 A1 * | 7/2007 | Jing | .................. | G06F 17/30265 |
| 2009/0006192 A1 * | 1/2009 | Martinez | ................ | G06Q 30/02 705/14.69 |
| 2009/0300511 A1 * | 12/2009 | Behar | ..................... | G06F 1/162 715/745 |

(Continued)

OTHER PUBLICATIONS

Malcolm Owen, "Disney Uses 'Pokemon Go'—like AR in iPhone app to promote upcoming 'Star Wars: The Last Jedi'", Apple Insider, Aug. 24, 2017. Retrieved from http://appleinsider.com/articles/17/08/24/disney-uses-pokemon-go-like-ar-in-iphone-app-to-promote-upcoming-star-wars-the-last-jedi.

*Primary Examiner* — Laurie A Ries
(74) *Attorney, Agent, or Firm* — John L. Rogitz

(57) ABSTRACT

In one aspect, a device includes at least one processor, a display accessible to the at least one processor, and storage accessible to the at least one processor. The storage includes instructions executable by the at least one processor to present an image of an object on the display, and present a graphical user interface (GUI) on the display with the GUI indicating the object. The instructions are also executable by the processor to present, on the GUI, at least one link to content that an end-user may associate with the object or that an end-user has associated with the object.

20 Claims, 11 Drawing Sheets

(56) References Cited

U.S. PATENT DOCUMENTS

| | | | |
|---|---|---|---|
| 2010/0174993 A1* | 7/2010 | Pennington | G06F 1/1616 |
| | | | 715/738 |
| 2011/0043652 A1* | 2/2011 | King | G06F 17/2211 |
| | | | 348/222.1 |
| 2011/0252359 A1* | 10/2011 | England | G06F 9/451 |
| | | | 715/781 |
| 2012/0290591 A1* | 11/2012 | Flynn | G06F 17/30247 |
| | | | 707/754 |
| 2013/0262585 A1* | 10/2013 | Niemeyer | H04L 65/60 |
| | | | 709/204 |
| 2014/0188946 A1* | 7/2014 | Hartman | G06F 17/30958 |
| | | | 707/805 |
| 2014/0194152 A1* | 7/2014 | Liu | H04L 67/06 |
| | | | 455/466 |
| 2014/0282263 A1* | 9/2014 | Pennington | G06F 1/1616 |
| | | | 715/838 |
| 2014/0380420 A1* | 12/2014 | Wang | G06F 17/30268 |
| | | | 726/4 |
| 2015/0160824 A1* | 6/2015 | White | G06F 3/04815 |
| | | | 715/849 |
| 2016/0259497 A1* | 9/2016 | Foss | G06F 3/0482 |
| 2016/0350421 A1* | 12/2016 | Multerer | G06F 17/30864 |
| 2017/0026672 A1* | 1/2017 | Dacus | G06Q 30/0233 |
| 2017/0178203 A1* | 6/2017 | Martinez | G06Q 30/02 |
| 2017/0235451 A1* | 8/2017 | Ehrlich | G06F 3/0484 |
| | | | 715/710 |
| 2017/0262477 A1* | 9/2017 | Carroll | G06F 17/30268 |

\* cited by examiner

SYSTEMS AND METHODS FOR END-USERS TO LINK OBJECTS FROM IMAGES WITH DIGITAL CONTENT

BACKGROUND

Image search techniques have been introduced for matching images, such as photographs of landmarks, with stored information associated with the images. However, as recognized herein, these techniques do not provide individual end-users with the capability to define associations of user-generated content, such as images of personal possessions or acquaintances, with other information. There are currently no adequate solutions to the foregoing computer-related, technological problem.

SUMMARY

Accordingly, in one aspect a device includes at least one processor, a display accessible to the at least one processor, and storage accessible to the at least one processor. The storage includes instructions executable by the at least one processor to present an image of an object on the display, and present a graphical user interface (GUI) on the display with the GUI indicating the object. The instructions are also executable by the at least one processor to present, on the GUI, at least one link to content that at least one of an end-user may associate with the object and an end-user has associated with the object.

In another aspect, a method includes presenting an image of an object on a display and presenting a graphical user interface (GUI) on the display. The GUI includes one or more options that are each selectable by at least one end-user to at least one of link respective digital content for the respective option with the object and present respective digital content for the respective option that has already been linked by at least one end-user with the object.

In yet another aspect, a computer readable storage medium (CRSM) that is not a transitory signal includes instructions executable by at least one processor. The instructions are executable to present an image of an object on a display and present a graphical user interface (GUI) on the display. The GUI includes one or more options that are each selectable by a first end-user to at least one of link respective digital content for the respective option with the object and present respective digital content for the respective option that has already been linked by one or more of the first end-user and a second end-user with the object.

The details of present principles, both as to their structure and operation, can best be understood in reference to the accompanying drawings, in which like reference numerals refer to like parts, and in which:

DETAILED DESCRIPTION

Figure 1:
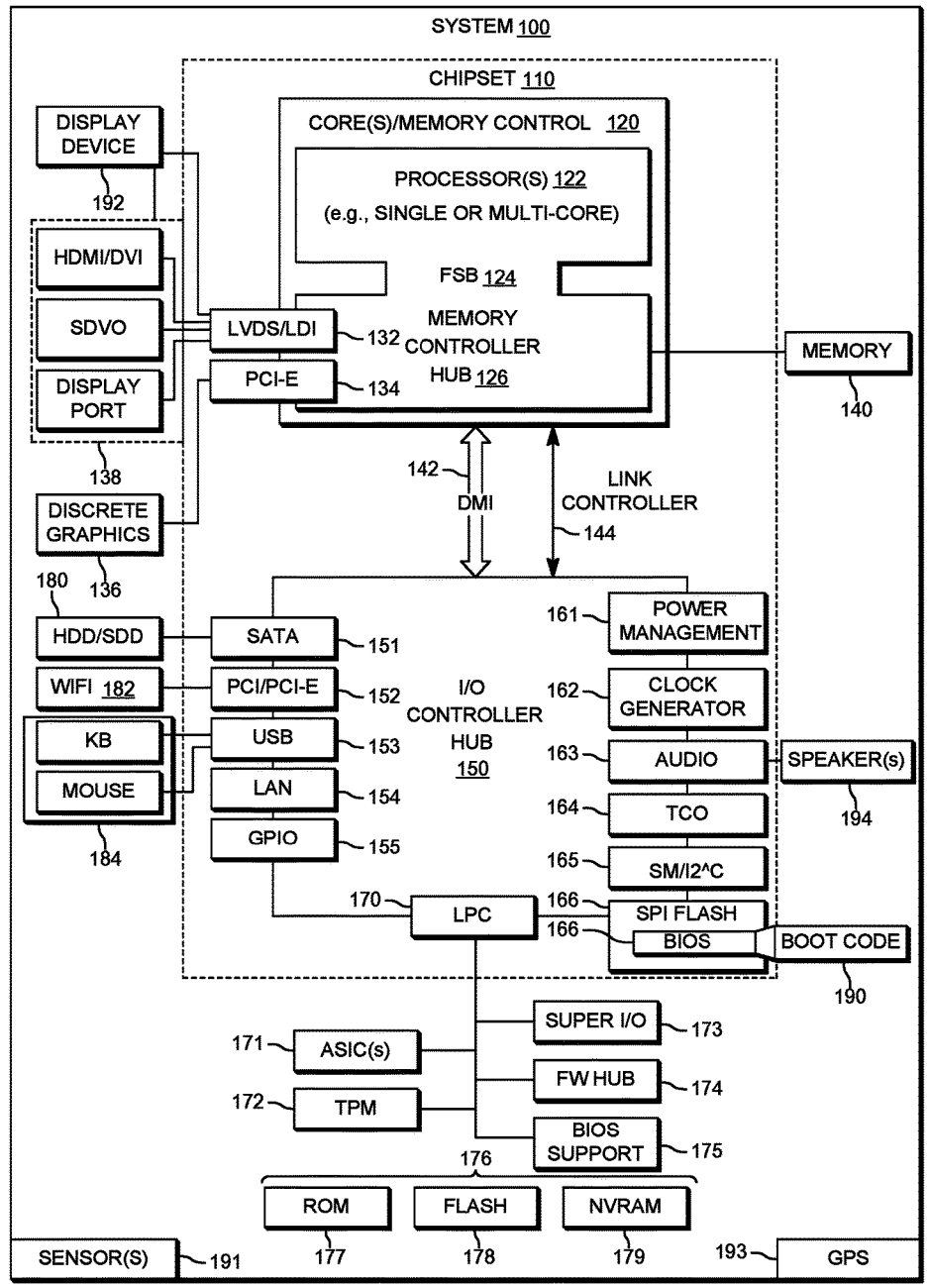
FIG. 1 is a block diagram of an example system in accordance with present principles.

The present application relates to technically inventive, non-routine solutions that are necessarily rooted in computer technology and that produce concrete technical improvements.

Disclosed herein are systems and methods for an end-user to link digital content to one or more real-world or virtual objects so that the end user or other people, at a later time, can experience the end-user's personalized associations of the objects with the linked digital content.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device (such as a hard disk drive, CD ROM or Flash drive) that is being vended and/or provided that is not a transitory, propagating signal and/or a signal per se. The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more sensors 191 from which input may be received. For example, the sensor (s) 191 may include an audio receiver/microphone that provides input from the microphone to the processor 122 based on audio that is detected, such as via a user providing audible input to the microphone so that, e.g., the user and voice commands may be identified based on voice identification. As another example, the sensor(s) 191 may include a camera that gathers one or more images and provides input related thereto to the processor 122 so that, e.g., the user may be identified based on facial recognition or other biometric recognition. The camera may be a thermal imaging camera, a digital camera such as a webcam, a three-dimensional (3D) camera, and/or a camera otherwise integrated into the system 100 and controllable by the processor 122 to gather pictures/images and/or video. The sensor(s) 191 may also be, for instance, another kind of biometric sensor such as a fingerprint reader, a pulse monitor, a heat sensor, etc.

The sensor(s) 191 may even include a motion sensor such as a gyroscope that senses and/or measures the orientation of the system 100 and provides input related thereto to the processor 122, and/or an accelerometer that senses acceleration and/or movement of the system 100 and provides input related thereto to the processor 122. Thus, unique and/or particular motion or motion patterns may be identified to identify a user's gestures based on input from the sensor(s) 191 and execution of gesture recognition software in accordance with present principles.

Additionally, the system 100 may include a location sensor such as but not limited to a global positioning satellite (GPS) transceiver 193 that is configured to communicate with at least one satellite to receive/identify geographic position information and provide the geographic position information to the processor 122. However, it is to be understood that another suitable position receiver other than a GPS receiver may be used in accordance with present principles to determine the location of the system 100. In some embodiments, the GPS transceiver 193 may even establish a sensor for use in accordance with present principles to identify a particular user based on the user being associated with a particular location (e.g., a particular building, a particular location within a room of a personal residence, etc.)

It is to be understood that an example client device or other machine/computer may include fewer or more features than shown on the system 100 of FIG. 1. In any case, it is to be understood at least based on the foregoing that the system 100 is configured to undertake present principles.

Figure 2:
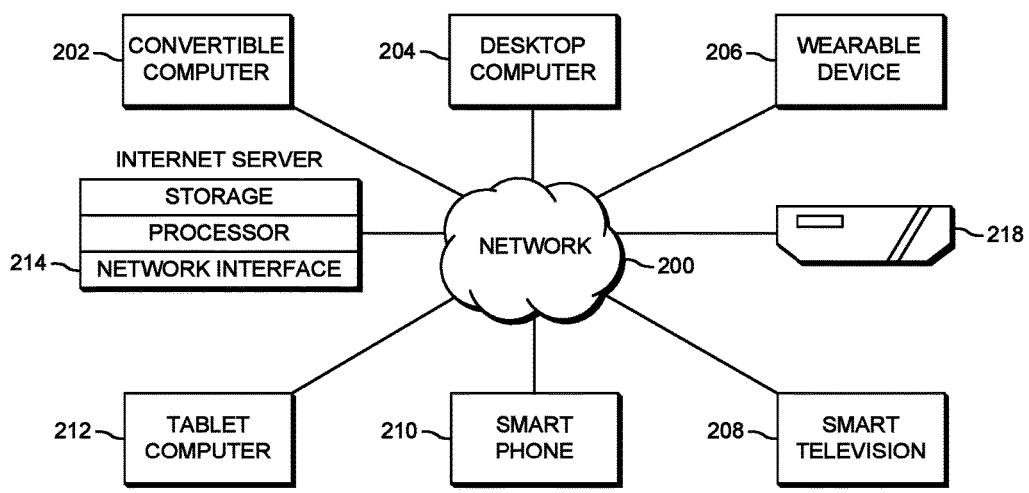
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a video game console 218, and a server 214 such as an Internet server that may provide cloud storage accessible to the devices 202-212, 218. It is to be understood that the devices shown in FIG. 2 are configured to communicate with each other over the network 200 to undertake present principles.

Figure 3:
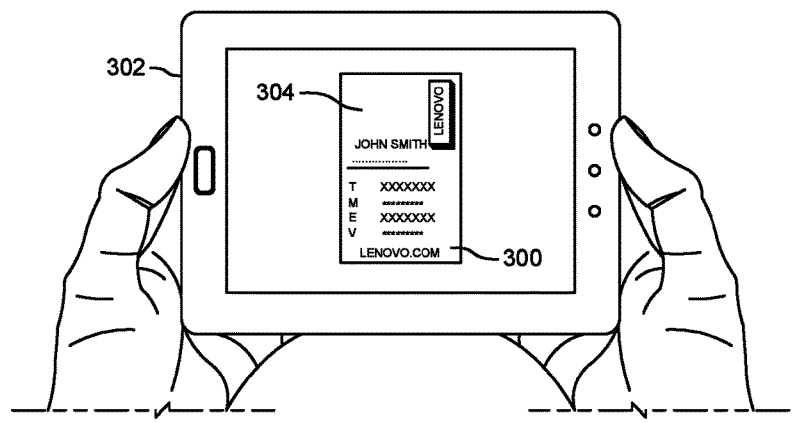
FIG. 3 is a screen shot of an example user interface (UI) consistent with present principles for accessing a built-in photographic linking application ("app") on a tablet computer.

Continuing the detailed description in reference to FIG. 3, it shows a screen shot of an example graphical user interface (GUI) 300 consistent with present principles for accessing a built-in photographic linking application ("app") on a tablet computer 302. The app may be "built-in" in the respect that the app has already been loaded onto the computer 302 at the time the computer 302 is vended to an end-user from a supplier, vendor, or manufacturer as part of another application or software on the computer 302, such as a camera application.

As may be appreciated from FIG. 3, the GUI 300 includes an image 304 of a real-world object, with the object being a business card in this example. The image 304 may have been received from a camera on the tablet computer 302, and/or the image 304 of the object may have been accessed from local storage or over the Internet. If received from the camera, the image may be a single image generated based on a user command to generate and save an image, and/or the image from the camera may be part of an image stream that is not stored at the computer 302 but presented as part of a real-time viewfinder feed. Also if received from the camera, the image 304 may be stored locally on the computer 302 and/or stored remotely in the cloud via a server for a social networking service associated with the built-in photographic linking app.

Figure 4:
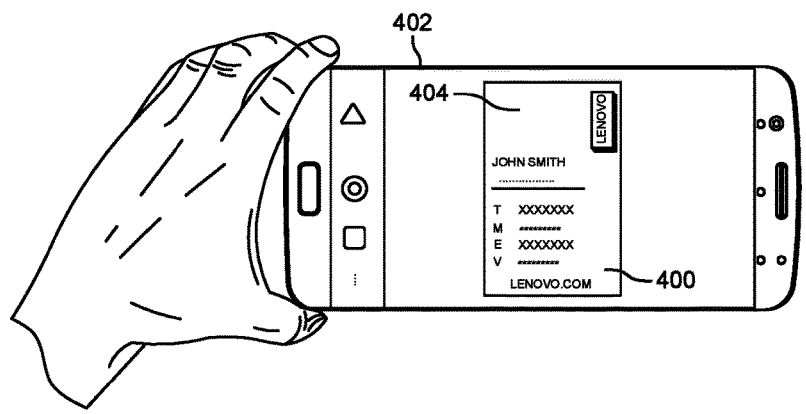
FIG. 4 is a screen shot of an example UI consistent with present principles for accessing the built-in photographic linking app on a mobile phone.

FIG. 4 shows a screen shot of an example GUI 400 consistent with present principles for accessing the built-in photographic linking app on a mobile phone 402. As may be appreciated from FIG. 4, the GUI 400 includes an image 404 of a real-world object, with the object again being a business card in this example. The image 404 may have been received from a camera on the mobile phone 402 (e.g., as may have been extracted or isolated from a base image from the camera that shows the business card and additional objects that were within the camera's field of view or background when the base image was generated) or the image 404 may have been accessed from local storage or over the Internet. If received from the camera, the image may be a single image generated based on a user command to generate and save an image, and/or the image from the camera may be part of an image stream that is not stored at the computer 302 but presented as part of a real-time viewfinder feed. Also if received from the camera, the image 304 may be stored locally on the computer 302 and/or stored remotely in the cloud via a server for a social networking service associated with the built-in photographic linking app.

Figure 5:
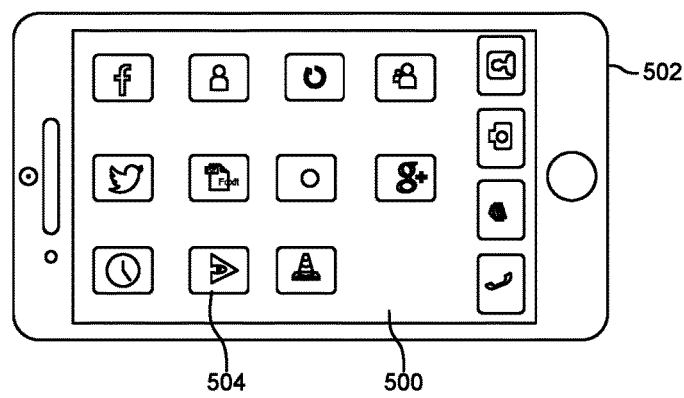
FIG. 5 is a screen shot of an example UI consistent with present principles for accessing the photographic linking app as may have been downloaded to a device.

FIG. 5 shows a screen shot of an example GUI 500 consistent with present principles for accessing a photographic linking app that has been downloaded, e.g., over the Internet via a mobile phone 502. In this example, and even the examples shown in FIGS. 3 and 4, the photographic linking app may establish or include a social networking application. As may be appreciated from FIG. 5, the GUI 500 includes an icon 504 that is selectable to launch or initiate the photographic linking app. Responsive to selection of the icon 504 by an end-user, the phone 502 may access a social networking service and/or initiate a camera on the phone 502 to present a viewfinder with an image stream from the camera.

Figure 6:
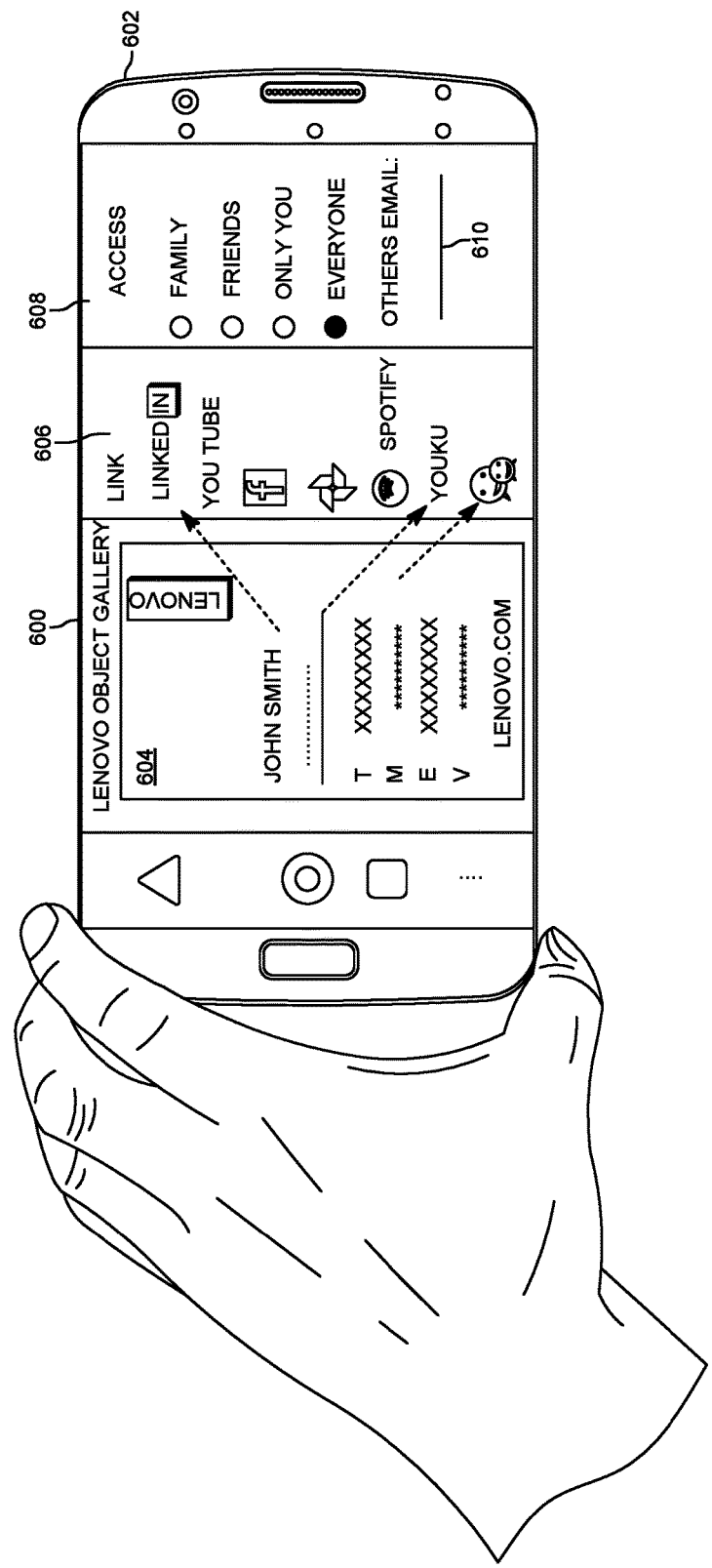
FIG. 6 is a screen shot of an example UI consistent with present principles for allowing a first end-user to link an object to one or more digital contents.

Moving on to FIG. 6, it shows a screen shot of an example GUI 600 consistent with present principles that is presentable on a mobile phone 602 as part of a photographic linking app. The GUI 600 allows a first end-user to link an object 604 that may be recognized and extracted from a base image from a camera to one or more different digital contents/assets by selecting one or more of the options and/or links 606 (referred to below simply as "links 606" for simplicity) that respectively link to the different digital contents. The object 604 may have been recognized or identified using object recognition software that is one or both of executed locally on the phone 602 or executed by a server in communication with the phone 602, with the server being provided with the base image showing the object 604 from the phone 602. The object recognition software and/or photo processing software may then be used to extract an image of the object from the base image so that other portions of the base image may be omitted in the extracted image. However, note that in other embodiments, the object need not be identified but may still be presented based on execution of image processing software to identify the boundaries of the object within the image, extract an image of the object based on the boundaries, and then present the extracted image of the object.

The selectable links 606 themselves may have been identified by the phone 602, a server in communication with the phone 602, and/or a social network associated with the photographic linking app being executed at the phone 602. The links 606 may have been identified as linking to digital content associable with the object 604 based on identification of commonalities in metadata or keywords associated with both the object 604 and digital contents associated with the respective links 606. For example, the phone 602 or a server may identify a particular person's name, John Smith, from the object 604 (a business card in this example) and then perform an Internet search to identify a web page also including the same name, with the web page being the digital content in this example. Hence, a location (e.g., website URL, or a location within an application or social networking service) for that web page may be identified and associated with one of the selectable links 606 so that the first end-user may associate the web page with the object 604 by selecting the respective link 606 associated with the location, should he or she choose to do so.

In addition to metadata commonalities that may be identified, data tables associating various digital content and/or digital content types with respective objects and/or object types may be accessed and used to identify the links 606 as associable with the object 604. Artificial intelligence that tracks the first end-user's digital behavior and actions may also be used to predict what digital content the user may link with the object 604 based on past actions and predicted future actions the first end-user might take (e.g., actions in sequence). Knowledge graphs may also be used to predict which digital content a user might link with the object 604 or might otherwise be relevant to the object 604.

Still in reference to FIG. 6, in practice the first end-user may link the object 604 with one or more of the links 606 by directing touch input or cursor input to one or more of the links 606 that are shown as being presented adjacent to the image of the object 604. Voice commands may also be used to indicate selection of one or more of the links 606. Additionally, note that more than one of the links 606 may be concurrently selected for association with the object 604.

Once the first end-user has selected one or more of the links 606 for association with the object 604, in some embodiments the first end-user may then set access privileges. The access privileges may define which other end-users and/or social networking friends of the first end-user may access the selected links 606 associated with the object 604 via the social networking service associated with the GUI 600 and to which the image of the object 604 and selected links 606 will be uploaded via a network connection. The other end-users may be set by selecting at least one of the selectors 608 that are respectively associated with different groups of end-users/friends or different particular end-users/friends. In the example shown, the groups and/or particular end-users may be respectively selected by directing touch or cursor input to respective radio buttons that are shown, or by voice commands indicating the particular groups/end-users.

Also note that FIG. 6 shows an input field 610 to which a user may direct text input to specify one or more additional end-users outside the social networking service to which the selected links 606 associated with the object 604 may be provided so that those other end-users may access the links either outside of the social networking service via the Internet or by joining the social networking service. Thus, in some embodiments the other end-users specified in field 610 may be sent an invitation through to download the social network's application/photographic linking app and join the social network to view the links 606 and associated digital content. In this particular example, these additional end-users may be specified by email address so that an email may be sent for accessing the links. However, other message formats may also be used, such as text message format based on the user indicating a particular phone number to which a text message should be sent.

Figure 7:
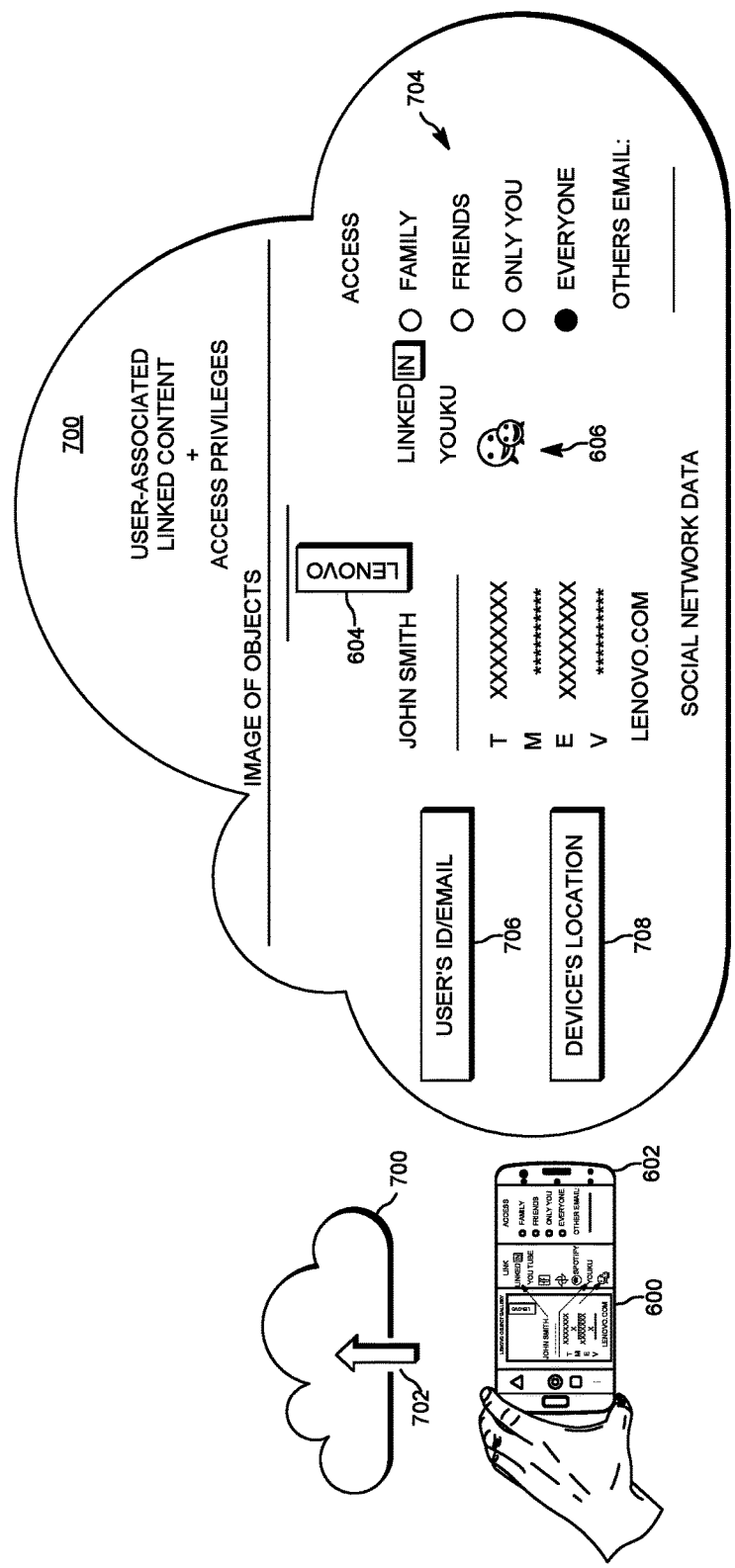
FIGS. 7-11, 14, and 15 show various combinations of example UIs, objects extracted from images, and cloud computing functionality consistent with present principles.

Then, as shown in FIG. 7, once the first end-user has linked the object 604 with one or more digital contents, the first end-user's device may upload the object 604 (or key components thereof) and the first end-user's assigned associated links 606 and access privileges to the social networking service via the cloud 700. The object 604 and/or links 606 may also be made available to others that the first end-user has specified as having access privileges by being posted to the first end-user's social networking page, social networking profile, and/or the news/update feed for others that are social networking friends with the first end-user and have been granted access privileges. Once made available, each link 606 may be selectable by the first end user and the other end-users to present the respective digital content linked with the object 604. The upload itself may be performed automatically responsive to selection of one or more of the links 606, automatically responsive to selection of one or more of the selectors 608, and/or based on an upload command or selection of an upload selector that might be presented on the UI 600 but is not shown for clarity.

FIG. 7 thus shows the cloud 700 as the object 604 and links 606 are being uploaded, signified by the arrow 702. On the right side of FIG. 7, it also shows an expanded view of the cloud 700 as storing the object 604 and links 606 as social networking data, as well as storing the access privileges 704 specified via selection of the selectors 608 and/or text entered to field 610 from FIG. 6. Also note that the digital content itself may not be uploaded and stored even though the image of the object 604 and the links 606 to the digital content are uploaded (though in other embodiments the digital content may in fact be stored in the cloud 700 for the social networking service). Thus, the social networking service can become a gatekeeper of sorts of certain metadata, such as the associations of certain objects with information and experiences that the first end-user considers to be relevant to the object 604.

Additionally, as shown in FIG. 7, in some embodiments a user's ID (e.g., real name, social networking name, or social networking handle) and email address data 706 may also be uploaded to the social networking service via the cloud 700 as metadata associated with the object 604 and/or links 606. Data 708 indicating the physical, geographical location of the first end-user's device (the phone 602 in this example) may also be uploaded as metadata. The physical location may be the location at which the image of the object 604 was taken, and/or the location may be the location from which the device uploaded the object 604 and links 606 to the cloud 700 as shown in FIG. 7. The location may be uploaded as GPS coordinates or in another format, such as city, state, and country format.

Both the first end-user's ID data 706 and device location data 708 may then be used at a later time should the first end-user or a second, different end-user who is a social networking friend of the first end-user search for links associated with the same object that were linked to the object by the first end-user specifically or his/her social networking friends. This may help reduce the search's scope and improve search-for-match accuracies with reduced search-times when, e.g., the second end-user might search for digital content via the object 604 and corresponding links 606 as might have been linked only by his or her social networking friends (or the first end-user specifically) rather than users at large of the social network. The search may also be tailored based on location so that, e.g., only links and objects associated by the first end-user with content while at a given location may be provided to the second end-user when the second-end user is also at or within a threshold distance to the same location.

Figure 8:
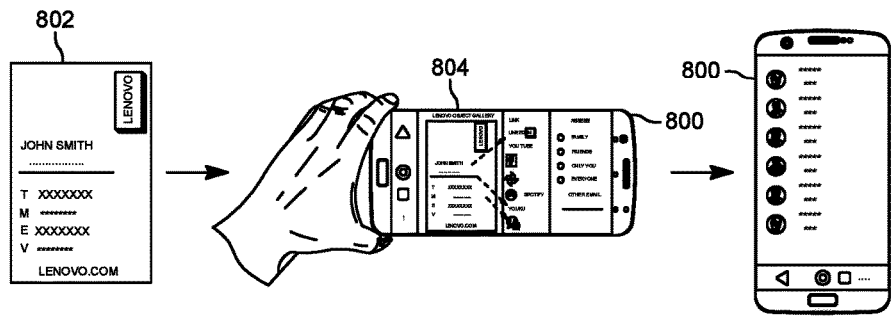
Figure 9:
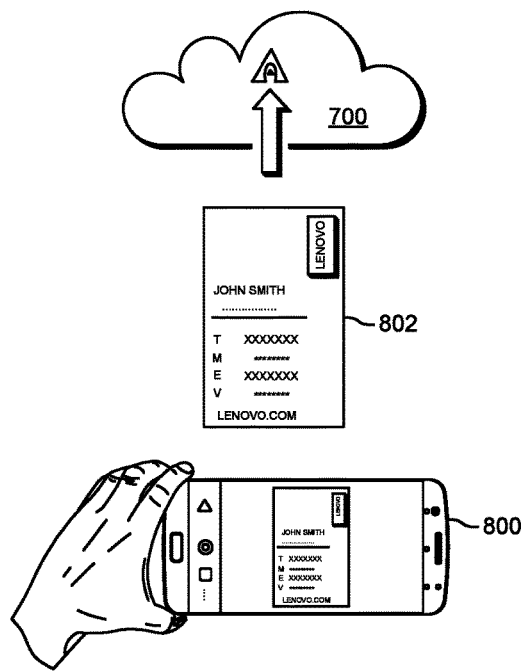
Figure 10:
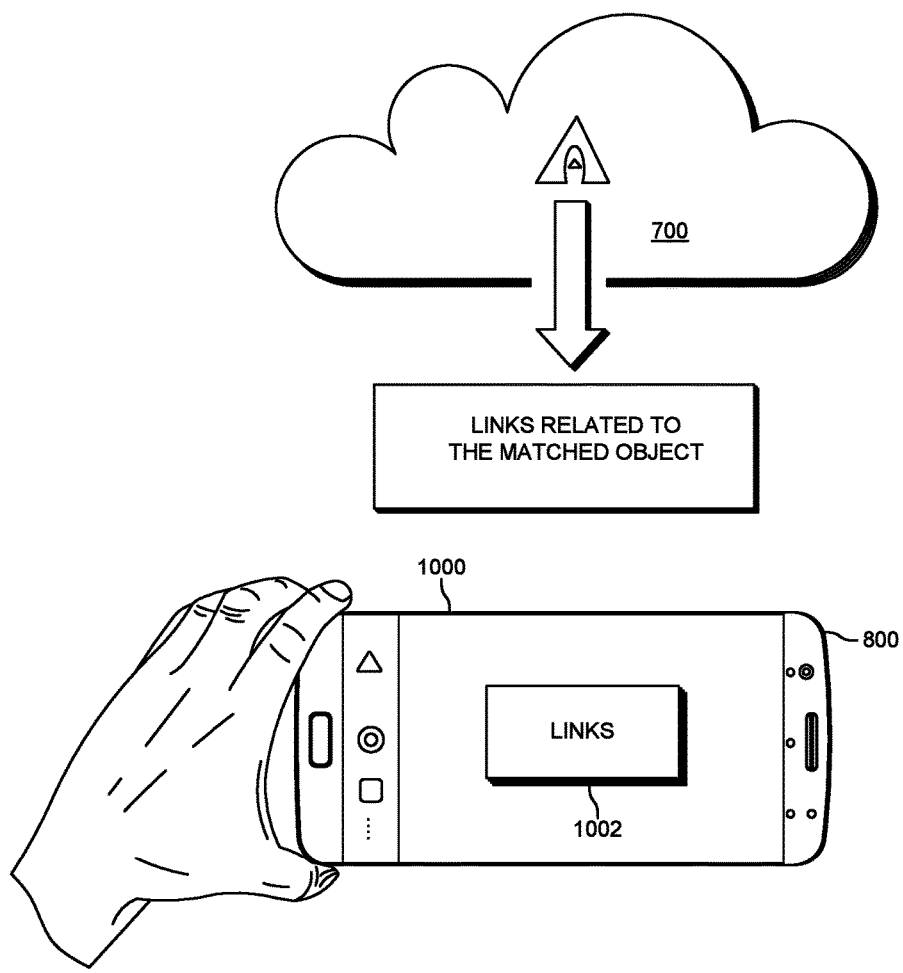

FIGS. 8-10 show screen shots of example GUIs consistent with present principles so that that a second end-user as referenced in the preceding paragraph may search for and/or view linked digital content for a particular object using the social networking service and/or photographic linking app. As shown in FIG. 8, the second user has taken a picture, using his or her mobile device 800, of a business card similar to the one above in that it also indicates the name of the same particular person indicated on the object 604. In some embodiments, from the base image of the business card an image object 802 may be extracted (e.g., the business card image is extracted from the rest of the image showing background items). The object may be extracted using object recognition software and/or another copy of the photographic linking app executing on the device 800.

Then, in addition to the base image that was taken possibly being saved to the mobile device 800 and its associated data that was identified saved to a contacts app on the device 800 for "John Smith", an image of the object 802 (the base image or the extracted image) may be presented on the GUI 804 shown in FIG. 8. Then, as shown in FIG. 9, the image of the object 802 (or key components thereof) may then be uploaded to the cloud 700 for the social networking service along with its given ID and location to search for another image (e.g., within a database of images stored in the cloud 700) that might have been uploaded to the social networking service that shows or matches the uploaded object 802 (or its components), its ID, and/or location.

Note that an exact image match need not be made (though it may be in some embodiments). For example, the object 802 from the base image taken using the device 800 may itself be identified and/or classified (e.g., using object recognition) and then the object as identified/classified may be used to search for data or different images also matching the object key components of the object, its ID, and/or its classification. E.g., the object may be identified as "business card for John Smith" and then a search for other image objects already uploaded to the cloud 700 and named or classified as "business card for John Smith" may be searched.

As another example, the object may simply be matched with a threshold level of confidence as corresponding to content shown in another, different image using an object matching algorithm and/or fuzzy logic algorithm.

In any case, if an object match is identified by the device 800 and/or social networking service, and assuming the second end-user has been granted access privileges by the first end-user, FIG. 10 shows that selectable links 1002 related to the matched object may be transmitted to the device 800 and presented thereon via a GUI 1000. The GUI 1000 may be presented on a touch-enabled display of the device 800 as part of the photographic linking app being executed at the device 800 to undertake present principles.

Figure 11:
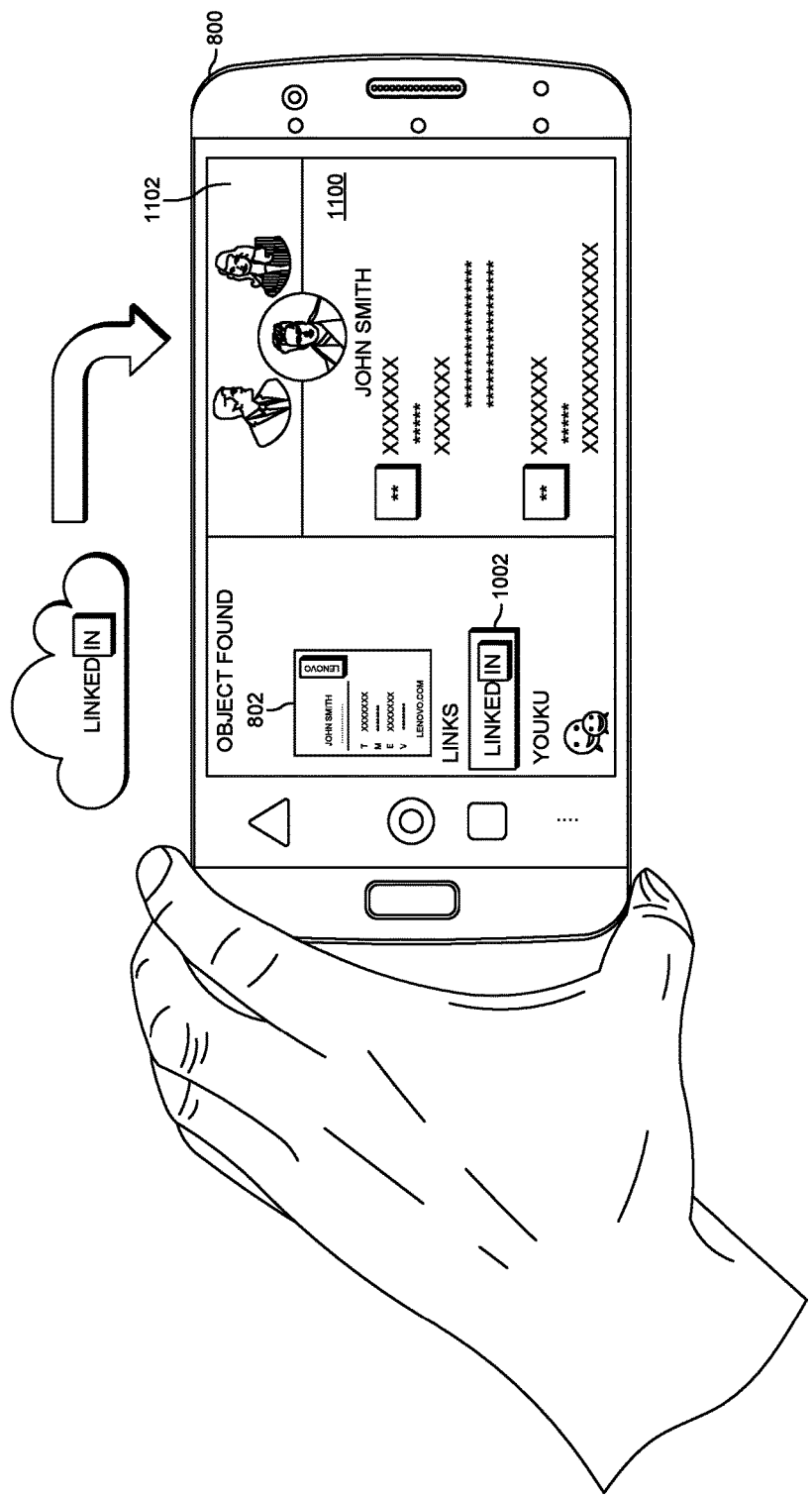

Then, responsive to the second end-user selecting one of the links 1002 presented on the GUI 1000 using, e.g., touch input directed to the touch-enabled display, the device 800 may present the GUI 1102 as shown in FIG. 11.

However, note that in other embodiments the GUI 1102 may be presented automatically responsive to links being identified for the matched object so that the GUI 1000 need not be presented. This may be useful when, e.g., image/object matches occur with high accuracy and there might only be one associated link for the object so that, in such a case, that associated linked content may simply be presented/played.

As shown in FIG. 11, the GUI 1102 may include digital content 1100. The digital content 1100 presented via the GUI 1102 may be presented responsive to selection of an associated link 1002 from the GUI 1000 or, if the GUI 1000 was not presented as set forth in the last sentence of the preceding paragraph, the digital content 1100 may be content associated with a first link (or only link) that is returned by the cloud 700 as already being associated with the matched object 802. In still other embodiments, no digital content may be presented at all until a user selects one of the links 1002 as presented on the GUI 1102.

In the example shown in FIG. 11, the LinkedIn page for the owner of the business card shown in the object 804 (John Smith) is the digital content, it being understood that LinkedIn is a different social networking service than the one associated with the photographic linking app and/or cloud. Note that the UI 1102 shows, adjacent to the digital content 1100, an image of the object 802 and the one or more links 1002 as also might have been presented on the GUI 1000 of FIG. 10. Also note that the first of the links 1002 has a box surrounding it to indicate that it is the currently-selected link associated with the content 1100 but that others of the links 1002 may also be selected using the GUI 1102 to then cause other digital content for the other link to be presented in place of where the digital content 1100 is presented on the GUI 1102. Accordingly, the second end-user may navigate between various digital contents that the first end-user linked with the object 802 using the GUI 1102 to experience content associated with the object 802.

Figure 12:
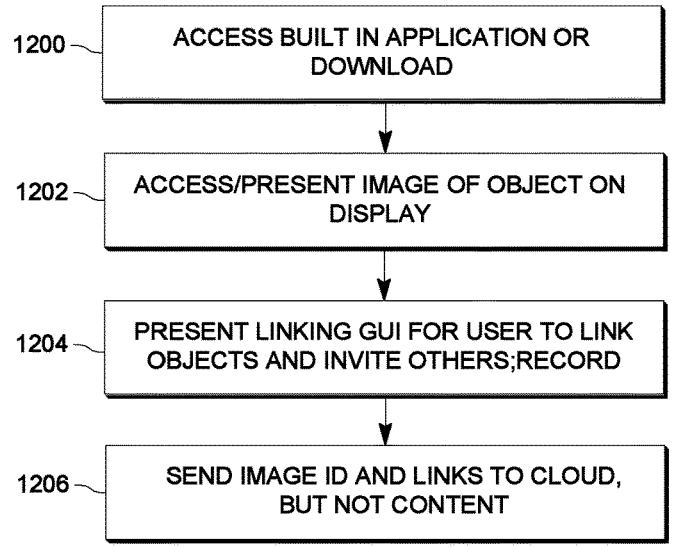
FIGS. 12 and 13 are flow charts of example logic consistent with the preceding figures.

Continuing the detailed description in reference to FIG. 12, it shows a flow chart of example logic that may be executed by an end-user's device for the end-user to associate an object from an image with one or more digital contents using links, and to permit others to access the objects and associated links as set forth above. Beginning at block 1200, the device may access a built-in or downloaded application, such as the photographic linking app disclosed above. The device may access the app automatically based on initiation of the device's camera or responsive to selection of an icon associated with the app as presented on the device's display.

From block 1200 the logic may proceed to block 1202 where the device may access and/or present an image of an object on its display. For example, at block 1202 the device control its camera to gather one or more base images using a current field of view of the camera and then present the image(s) on the display. Additionally or alternatively, at block 1202 the device may access and present a previously-stored image such as an image from the device's image gallery, an image from a different social networking service, an image from a video-sharing website, etc.

Also at block 1202, in some embodiments the device may identify objects in the presented image and extract/isolate separate images of each of the objects from the presented base image using, e.g., image processing software. In other embodiments, the device may not necessarily identify the object but may still extract an image of the object(s) based on boundaries for the object(s) identified from the base image using image processing software.

After block 1202 the logic may proceed to block 1204 where the device may present a linking GUI for the end-user to link one of the objects from the presented image with one or more digital contents, and to invite others to experience the end-user's association of the object with one or more digital content(s). For example, at block 1204 the GUI 600 may be presented. Also at block 1204, the device may receive/identify and then store one or more of the object ID, the extracted image of the object, the associations made by the end-user locally on the device, and any access privileges specified by the end-user.

From block 1204 the logic of FIG. 12 may then proceed to block 1206 where the device may upload the object ID, extracted image of the object and/or key components of the object, links indicating associated digital content(s), and/or access privilege information to the cloud server of the social networking service associated with the app. Thus, note that in this example the digital content itself is not uploaded or copied to the cloud.

Figure 13:
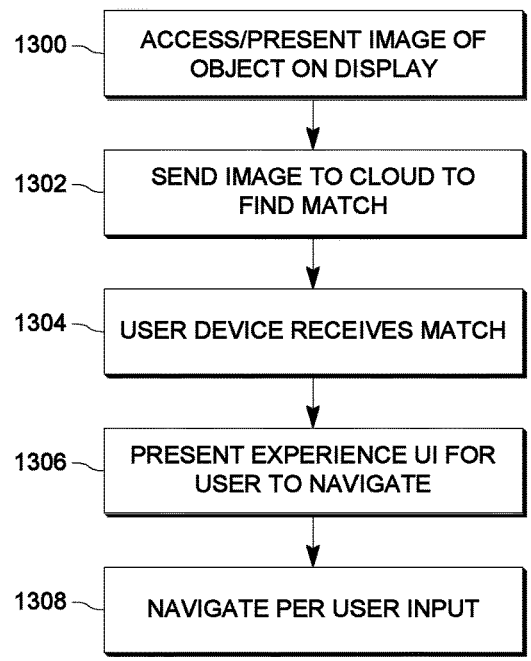

Now in reference to FIG. 13, it shows a flow chart of example logic that may be executed by an end-user's device for one end-user to view digital content that another end-user has associated with a given object, as described herein. Beginning at block 1300, the device may present an image on its display. For example, the device may control its camera to gather one or more base images (or an image stream) using a current field of view of the camera so the device's software can recognize and/or extract an object in the field of view and then present the extracted image on the display. Additionally or alternatively, at block 1300 the device may access and present an already-taken image from its local storage (e.g., from its image gallery), or access and present a virtual object from the Internet.

If extracting an image of the object from a base image from the camera, the device may do so using its own copy of the photographic linking app in accordance with present principles so that, also at block 1300, the device may recognize an object from the base image and extract an image of the object (e.g., as isolated from the rest of the background of the base image).

The logic of FIG. 13 may then move to block 1302 where the device may transmit the image/object to a social network's cloud server over a network such as the Internet so that the cloud (and/or end-user's device) may search for a match to the object based on data stored in the cloud. For example, at block 1302 the device may transmit the entire image that is presented to the cloud so that the cloud can use it as the basis of a search for an object match to within a threshold degree of confidence using a convolved neural net system and/or fuzzy logic (e.g., without necessarily performing object identification and extraction).

Additionally or alternatively, in some embodiments at block 1302 the device may search its own locally-stored database for an object match so that, e.g., the end-user may ultimately link objects, record the links on his/her device and later retrieve the linked content without any network connection.

Also at block 1302, in embodiments where object identification and extraction is to be performed, this may be performed locally at block 1302 or performed by the cloud server by uploading the base image to the cloud at block 1302 so that the cloud can search for a match. In either case, the object identification and extraction may be performed, e.g., using object recognition software to determine an identification (ID) for the object and then searching a database of objects and object IDs for an object match to the ID.

From block 1302 the logic may then proceed to block 1304 where the device may receive back (e.g., from the cloud) an answer regarding whether a match to the object shown in the "candidate" image that was presented on the device's display has been found. If a match has in fact been found, at block 1304 the device may also receive the associated links/data for the matched object, a previously-stored image of the matched object, and/or even the associated digital content itself. Additionally, or alternatively, at block 1304 the device may determine a match locally based on locally-stored data, as set forth above.

The logic may then move to block 1306 where the device may present an "experience" GUI for the end-user to navigate, such as the GUI 1000 or GUI 1102 described above. From there the logic may proceed to block 1308 where the device may receive user input to navigate the GUI and accordingly present digital content associated with a particular link that might be selected by the user using the GUI.

Figure 14:
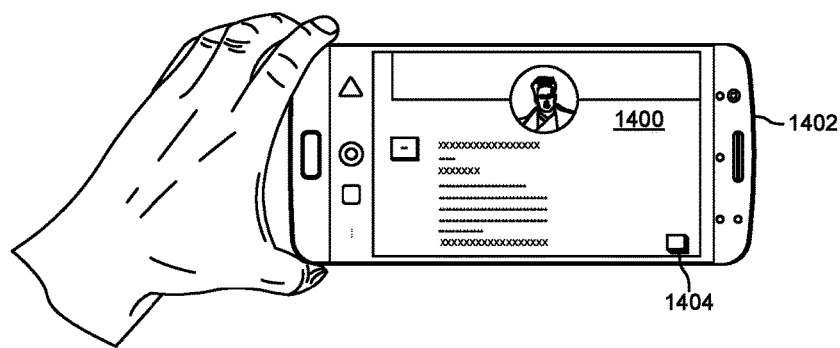
Figure 15:
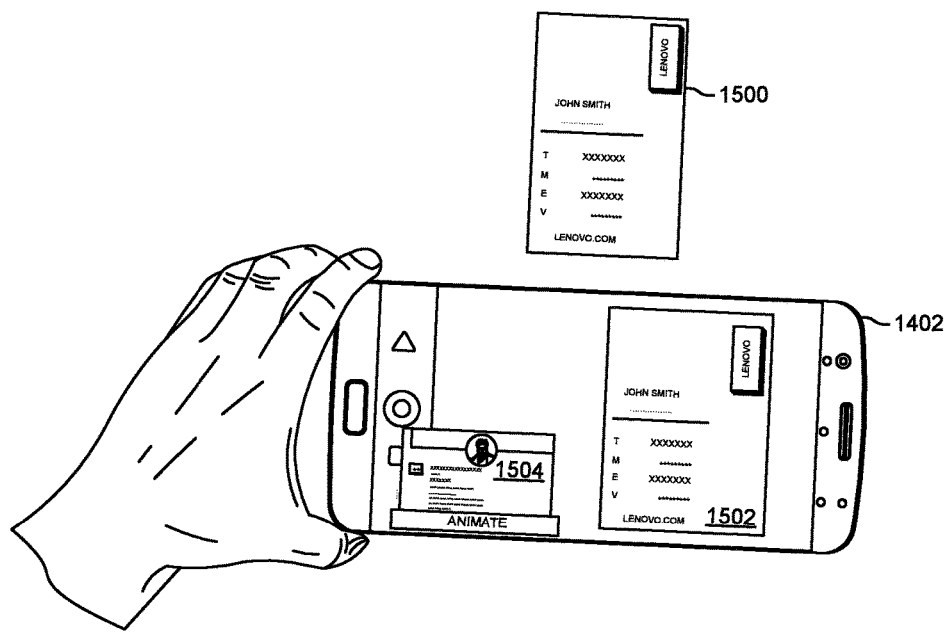

Continuing the detailed description in reference to FIGS. 14 and 15, these figures show another embodiment in accordance with present principles. As shown in FIG. 14, an end-user may view digital content 1400 such as a LinkedIn webpage for John Smith via a mobile phone 1402. While the phone 1402 presents this digital content, the end-user may provide gesture input to the phone 1402, such as a finger swipe across the touch-enabled display of the phone 1402 or a shaking of the phone as detected by an accelerometer on the phone 1402. Additionally or alternatively, the gesture may be touch input directed to a social networking icon 1404 presented on the display of the phone 1402.

Then, responsive to receiving this gesture, the phone 1402 may automatically launch a photographic linking app in accordance with present principles and initiate a camera on the phone so that an image stream from the camera may be presented as a viewfinder stream on the display of the phone 1402. Then, as shown in FIG. 15, a user may control the phone 1402 to orient the camera toward an object within the end-user's environment that the end-user wishes to associate with the digital content 1400. In this example, the object is a business card for John Smith, but it may also be, for example, a resume for John Smith printed on paper.

The user may then provide input to the phone 1402, such as a command to take a picture, and responsive to that input the phone 1402 may automatically take a base picture using the camera and, in some embodiments, extract an image 1502 of just the object from the base picture. The phone 1402 may also automatically save the picture/image of the object (base or extracted image) along with a link to the digital content 1400, such as a website uniform resource locator (URL) for the digital content 1400, to the phone 1402 and/or upload the data to a social networking service's cloud server in accordance with present principles. Note that a thumbnail 1504 of the digital content itself may also be presented while the image 1502 is presented to indicate to the end-user that the digital content is being associated with the object 1500. In this way, the digital content 1400 may be viewed first and the end-user may then associate an object within his or her surroundings with the digital content 1400, thereby allowing that end-user and others to experience the end-user's association of the digital content 1400 with the object.

Figure 16:
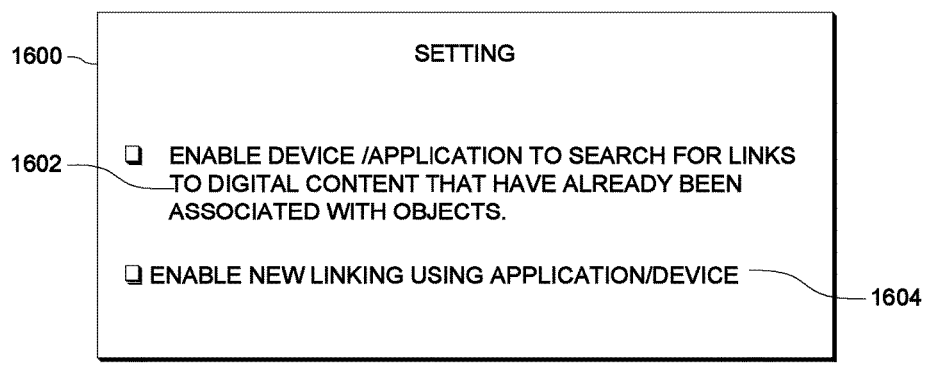
FIG. 16 shows an example UI for configuring settings of a device or app consistent with present principles.

FIG. 16 shows an example GUI 1600 presentable on an end-user's device in accordance with present principles for configuring settings of the end-user's device or photographic linking app. The GUI 1600 may include options 1602 and 1604, both of which are selectable using the respective check box shown adjacent to each one to thereby enable the underlying function associated with the option. Option 1602 may be selected to enable the device or app to automatically search for links to digital content that have already been respectively associated with objects and to present another GUI (such as the GUIs 1000 or 1102 described above) for selecting one or more of the already-associated links. Option 1604 may be selected to enable the device or app to present another GUI (such as the GUI 600 described above) at which the user may newly link an object from an image presented on the device's display with digital content for future use.

Note that digital content/assets as disclosed throughout this specification may include not just websites but end-user generated data such as images and videos. It may also include data and content on other social networking platforms, data and content on other online platforms or services or applications, avatars, augmented reality objects and assets, virtual reality objects and assets, three-dimensional (3D) animations, videos, images, music playlists and audio tracks/songs and other recordings, photographs, content within other applications executable by the end-user's device, and still other types of digital assets.

Additionally, it is to be understood in accordance with present principles that object data (e.g., an image of the object and the object's ID) and associated links to digital content that an end-user has associated with the object may be stored locally on the end-user's personal device alone in some embodiments. In such an instance, the data for the object ID and links may be linked to the image itself as stored in the photo/video gallery of the end-user's device. Thus, a social networking service need not necessarily be used and hence the end-user's device need not necessarily store this data remotely, though in other embodiments it may in fact do so.

Also note that an end-user as referenced herein may be a consumer or purchaser of a device or product instead of a person working for the manufacturer, vendor, or supplier of the device or product.

Providing some example use cases in accordance with present principles, suppose an end-user takes a picture of a bottle of his medicine. The end-user may then link the object (the bottle of medicine) to his recorded video from his pharmacist, or to an online video demonstrating the correct way to administer the medicine that the end-user's device has automatically found and played on the end-user's device responsive to identifying the medicine. The end-user may then go back later and easily locate the video by pointing his camera at (or taking a picture of) the bottle of medicine and be presented with a link to the same video, should he forget how to administer the medicine.

As another example, suppose an end-user has locked her purse and keys inside her vehicle, but also suppose the user had previously taken a photograph of her road service card (that is also locked in the vehicle) and linked it to her license plate. In order to call for assistance, the user may thus take a picture of her license plate and be presented with a link to her road service card. She may then select the link to be presented with an image of the road service card so that she may call a phone number indicated on the card for assistance. Other linked content may also be presented, such as an image of the end-user's driver's license, a link to the Department of Motor Vehicle's website, an image of a key used to unlock the vehicle, and information about the vehicle itself.

For another use case, suppose a framed photograph located in an end-user's home that shows the user's wedding has been linked to a video of the wedding. The end-user may point his/her camera at the photograph and, even though the user does not provide a command for the camera to take a picture of the photograph but merely presents the photograph via the device's viewfinder, the device may present the end user with a link to the video or may actually automatically begin playing the video itself.

As another example, suppose an end-user has taken a 360-degree photograph or video. Then suppose the user prints part of the 360-degree photograph or prints a frame from the video to place in a picture frame in their residence. Also suppose the end-user then takes a photograph of the framed picture and links it to the original 360 degree photograph or video. The user may then go back at a later time and point his or her device's camera at the framed image as located in the residence and be presented with the link to the original 360 degree photograph or video so that the user may interact with it on the device's display.

Providing another use case, suppose a wall in an end-user's personal residence has a framed photograph mounted thereon, where that framed photograph was previously linked to a video. The end-user may point the camera on the back side of his/her device's phone at the framed photograph and, using augmented reality (AR) processing, be presented with the video on the device's display on the other side of the device so that the video appears within the same boundaries as the framed photograph itself (using AR processing) notwithstanding the user potentially moving the device while viewing the video. This may give the impression to the end-user that the framed photograph has been animated or has "come alive" as the user views the framed photograph through their viewfinder on the device's display.

As another example, suppose a child's grandmother is recorded as reading a book to her grandchild and the recording is linked to an ID for the book itself. The recording and ID may then be uploaded to a social networking service and shared with friends of the grandchild. Then, at a later date when the grandmother is not present, the grandchild may take a picture of the same book and be presented with a link to the recording, or be presented with the recording itself, so that the child may turn the pages of the book and follow along as the recording is played.

As yet another example, objects in the real world (and also digital/virtual objects, in some examples) may be linked to 3D content, VR content, and/or avatars so that, for example, a book on fish may be linked to a 3D fish that a user can interact with via AR software. The end-user may even watch VR content using a VR headset that is linked to the book on fish.

Other objects in the real world may also be linked to AR characters or avatars. For instance, a user may take a "selfie" in front of the Golden Gate Bridge with an AR character also shown in the selfie, and then that selfie may be shared with others and linked to certain objects like the Golden Gate Bridge itself. Then the end-user may point his/her device's camera at a different photograph of the Golden Gate Bridge, taken from a different perspective of the bridge, and be presented with a link to the selfie.

An image of an end-user's mailbox may also be linked to AR characters, like an AR monster, and then uploaded to the cloud. Then, when other end-users search for links involving the same mailbox by taking a picture of the mailbox using their own respective devices, but only on Halloween as specified in access permissions, they may be presented with AR monsters on their device's display so that the monsters appear on the property associated with the mailbox when those users hold their device displays up against the property in the background.

Providing another use case, suppose an end-user takes a 3D selfie photograph of himself/herself and then shares it to one social network. The end-user may then take a selfie movie of himself/herself and post it to a different social network. Thereafter, the user may photograph their personal documents and credit cards and link them to the end-user's face (the object in this example) as posted on the first social network and the movie of the end-user as posted on the other social network. Then, should anyone find and photograph the personal documents or credit cards if the end-user loses them, the other person may be made aware of whom the documents and credit cards belong to by viewing a link to the end-user's face on one of the social networks.

Souvenirs from a vacation may also be linked to digital content. For example, a figurine souvenir may be linked to photographs of a trip on which the figurine was purchased. Then, at a later time, the end-user may orient their camera at the figurine so that it is shown in the viewfinder and be presented with links to the photographs from the trip.

Product packaging and labels may also be linked to digital content such as video games, photographs, or electronic notes taken by an end-user. Gift cards and gifts can also be linked to videos or animations so that one end-user to which a gift card or gift is given can view videos or animations linked by the person that gifted the card or gift.

As another example, suppose a "mod" for a device such as a photograph printer that is attachable to an end-user's phone can be used to print a photograph of a party taken using the end-user's phone. That printed photograph may itself be photographed using the same phone and then linked to videos and other photographs of the party and uploaded to a social network. Then when another user wishes to see memories from the party, he or she may point their camera at the same printed photograph and be presented with links to the videos and other photographs.

Providing another use case, suppose an end-user is at a museum and takes a picture of a work of art, or simply points their activated camera at the work of art or a description associated with the work of art. The user may then be presented with links to professionally developed supplemental content associated with the work of art, such as pictures of other art associated with the same artistic era.

As another example, an end-user may record his/her own voice speaking as part of digital content that is to be linked to a real-world object. The audio recording, and/or associated text identified from the recording using speech-to-text software, may then be stored locally on the end-user's device and/or in the cloud (e.g., as part of the cloud's database with the image) and then retrieved and replayed at a later time based on selection of an associated link. Accordingly, it is to be understood that both an end-user's voice recording and the converted text are examples of digital content that can be linked to an object by an end-user in accordance with present principles.

As still another example, image analysis and object recognition software may be used to process a viewfinder video stream, and hence process the content of the stream as shown on a device's display. A user may thus be looking at an image shown on screen from a Facebook posting and the user may then link that image to certain digital content or search for previously-linked content associated with the object shown in that on-screen image. Hence, objects within images may themselves each be a sort of hash tag, e.g., a pictorial version of an "index topic".

E.g., an end-user may point his/her device's camera at a university logo and link it to a fight song for that university. Other end-users could then search for related (public) links to that same logo and could quickly find and play the fight song by starting with the same object with their own image on their own viewfinder feed and searching for linked content associated with the object.

Also note that accuracy and scope for searching for matches to objects via a social network may me tailored based on a user ID so that, e.g., an end-user may have their search results tailored to only results for links generated by social networking friends of the user. Additionally or alternatively, location data may also be used in that an end-user's device's current location and the location of an object that was imaged may be linked as a way to first search for an image match before the search is made broader by not using location as a parameter. In this way, search results associated with a given location may be given priority over those not associated with the location, and if no matches are returned then a search based on user ID or other parameters (e.g., just the object ID itself) may be used.

As another way to aid in searching, periodically data from a social networking cloud may be transmitted to an end-user's device, e.g., over Wi-Fi networks only. Then when the end-user points his/her camera at an object, the end-user's device may use vision processing software to identify an object in the image stream and take certain actions such as saving associated content into the device's storage itself and searching a local database on the device for an object match and associated links. Then, if no match can be identified locally on the device's storage, the cloud itself may be searched for a match and links may be returned to the device from the cloud, access privileges permitting.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a display accessible to the at least one processor;
   storage accessible to the at least one processor and comprising instructions executable by the at least one processor to:
   present an image of an object on the display;
   present a graphical user interface (GUI) on the display, the GUI indicating the object; and
   present, on the GUI, at least one link to content that at least one of: an end-user may associate with the object, an end-user has associated with the object, wherein the object comprises an image of a bottle of medicine, the content linked to the object comprising a video concerning the medicine, the content being automatically found and played on an end-user's device responsive to identifying the medicine.

2. The device of claim 1, wherein the GUI is associated with a social network through which people may access the at least one link to content that at least one of: an end-user may associate with the object, an end-user has associated with the object.

3. The device of claim 1, wherein the instructions are executable by the at least one processor to:
   present, on the GUI, at least one link to content that an end-user may associate with the object;
   receive input from the end-user, the input from the end-user indicating an association between the link and the object; and
   upload, to a social network, an image of the object and data associating the link and the object.

4. The device of claim 1, wherein the content comprises virtual reality (VR) content and the object is a real world object.

5. The device of claim 1, wherein the content comprises audio and the instructions are executable to:
   responsive to receiving an image of the object from an end user device, access the link to play the audio.

6. The device of claim 1, wherein the instructions are executable to identify the link as linking to the object based on identification of commonalities in metadata or keywords associated with both the object and digital contents associated with the link, identification of the link as linking to the object comprising identifying text in the object and then performing a network search to identify at least one web page also including the text, digital contents comprising the at least one web page, a network location of the at least one web page being identified and associated with at least one selectable link so that a user may associate the at least one web page with the object by selecting the selectable link.

7. A method, comprising:
   presenting an image of an object on a display, the image being generated by a user device;
   presenting a graphical user interface (GUI) on the display, the GUI comprising one or more options, the one or more options each being respectively selectable by at least one end-user to at least one of: link respective digital content for the respective option with the object, present respective digital content for the respective option that has already been linked by at least one end-user with the object;
   wherein the object comprises an image of a road service card and the content linked to the object includes a license plate number, and the instructions are executable to, responsive to receiving an image of the license plate number, present an image of the road service card on an end use display.

8. The method of claim 7, wherein the GUI is presented as part of a social network accessible via the device.

9. The method of claim 7, comprising:
   presenting, on the GUI, one or more options, the one or more options each being respectively selectable by at least one end-user to link respective digital content for the respective option with the object;
   receiving input from a first end-user selecting at least one of the one or more options;
   linking, with the object and responsive to receiving the input from the first end-user, respective digital content for the respective one or more options that are selected; and
   making a link available via a social network, the link being selectable via the social network to present the respective digital content linked with the object.

10. The method of claim 9, comprising:
    permitting the first end-user to set which other end-users may access the link.

11. The method of claim 7, comprising:
    presenting, on the GUI, one or more options, the one or more options each being respectively selectable by a first end-user to present respective digital content for the respective option that has already been linked by a second end-user with the object, the second end-user being different from the first end-user;
    receiving a selection of at least one of the one or more options; and
    presenting, at the device and responsive to receiving the selection, the respective digital content for the respective option that is selected.

12. The method of claim 7, wherein the respective digital content for each of the one or more options is one or more of: accessible using an application executed at the device, accessible via the Internet.

13. The method of claim 7, wherein the GUI comprises an extracted image of the object.

14. The method of claim 7, comprising:
once the object is linked with the digital content, uploading at least portions of the object and links associated therewith to a network, such that the object and links associated therewith are made available on the network for selection thereof by network users to present respective digital content linked with the object, at least a user ID being associated with the object in the network along with data indicating a physical location of the user device; and
using the user ID and data indicating a physical location in a search for links associated with the object.

15. A computer readable storage medium (CRSM) that is not a transitory signal, the computer readable storage medium comprising instructions executable by at least one processor to:
present an image of an object on a display;
present a graphical user interface (GUI) on the display, the GUI comprising one or more options, the one or more options each being respectively selectable by a first end-user to at least one of: link respective digital content for the respective option with the object, and present respective digital content for the respective option that has already been linked by one or more of the first end-user and a second end-user with the object, wherein the second end-user being different from the first end-user, wherein the object comprises a photograph and the content linked to the photograph is a video, and the instructions are executable to, responsive to receiving an image of the photograph in a device's viewfinder, present the link to the video or automatically begin playing the video.

16. The CRSM of claim 15, wherein the one or more options are each respectively selectable by the first end-user to link respective digital content for the respective option with the object.

17. The CRSM of claim 15, wherein the one or more options are each respectively selectable by the first end-user to present respective digital content for the respective option that has already been linked by one or more of the first end-user and a second end-user with the object.

18. The CRSM of claim 15, wherein the GUI is presented via a social networking application executed by a device controlling the display.

19. The CRSM of claim 15, the image being generated by a camera of a device embodying the CRSM and at least one processor, the instructions being executable to:
transmit the image to a server over a network such that the server searches for a match to the image in the network;
receive back from the network at least one link to the digital content associated with the object; and
present the digital content responsive to selection of the link.

20. A device, comprising:
at least one processor;
a display accessible to the at least one processor;
storage accessible to the at least one processor and comprising instructions executable by the at least one processor to:
present an image of an object on the display;
present a graphical user interface (GUI) on the display, the GUI indicating the object; and
present, on the GUI, at least one link to content that at least one of: an end-user may associate with the object, an end-user has associated with the object, wherein the object comprises a photograph and the content comprises video, and the instructions are executable to, responsive to receiving an image of the photograph, present the video on a display so that the video appears within boundaries of the object.

* * * * *